US009058660B2

(12) United States Patent
Hamming et al.

(10) Patent No.: US 9,058,660 B2
(45) Date of Patent: Jun. 16, 2015

(54) FEATURE SEARCHING BASED ON FEATURE QUALITY INFORMATION

(71) Applicant: Gravity Jack, Inc., Liberty Lake, WA (US)

(72) Inventors: Benjamin William Hamming, Spokane, WA (US); Shawn David Poindexter, Coeur d'Alene, ID (US)

(73) Assignee: GRAVITY JACK, INC., Liberty Lake, WA (US)

( * ) Notice: Subject to any disclaimer, the term of this patent is extended or adjusted under 35 U.S.C. 154(b) by 269 days.

(21) Appl. No.: 13/683,872

(22) Filed: Nov. 21, 2012

(65) Prior Publication Data
US 2014/0140623 A1 May 22, 2014

(51) Int. Cl.
*G06K 9/46* (2006.01)
*G06T 7/00* (2006.01)
*G06K 9/00* (2006.01)

(52) U.S. Cl.
CPC .......... *G06T 7/0044* (2013.01); *G06K 9/00671* (2013.01)

(58) Field of Classification Search
CPC ....................................................... G06K 9/46
USPC ....................................................... 382/190
See application file for complete search history.

(56) References Cited

U.S. PATENT DOCUMENTS

| 7,657,100 | B2 * | 2/2010 | Gokturk et al. | 382/209 |
|---|---|---|---|---|
| 7,991,232 | B2 * | 8/2011 | Iwamoto | 382/190 |
| 8,150,164 | B2 * | 4/2012 | Oh et al. | 382/190 |
| 8,749,658 | B2 * | 6/2014 | Hamada | 348/222.1 |
| 2006/0045337 | A1 * | 3/2006 | Shilman et al. | 382/181 |
| 2011/0222781 | A1 * | 9/2011 | Nguyen et al. | 382/218 |
| 2011/0242133 | A1 | 10/2011 | Greaves et al. | |
| 2012/0025974 | A1 | 2/2012 | Richey et al. | |
| 2012/0025975 | A1 | 2/2012 | Richey et al. | |
| 2012/0025976 | A1 | 2/2012 | Richey et al. | |
| 2014/0078174 | A1 | 3/2014 | Williams et al. | |
| 2014/0079281 | A1 | 3/2014 | Williams et al. | |
| 2014/0079320 | A1 * | 3/2014 | Hamming et al. | 382/190 |
| 2014/0140623 | A1 * | 5/2014 | Hamming et al. | 382/190 |

OTHER PUBLICATIONS

U.S. Appl. No. 13/473,466.
U.S. Appl. No. 61/702,181, filed Sep. 17, 2012, Hamming, et al., "Image Tracking in an Augmented Reality Environment" 4 pages.
U.S. Appl. No. 13/683,902, filed Nov. 21, 2012, Hamming, et al., "Pose Tracking through Analysis of an Image Pyramid" 40 pages.

* cited by examiner

*Primary Examiner* — Gregory M Desire
(74) *Attorney, Agent, or Firm* — Wells St. John P.S.

(57) ABSTRACT

Techniques for searching in an image for a particular block of pixels that represents a feature are described herein. The techniques may include generating feature quality information indicating a quality of the feature with respect to blocks of pixels of the image. The feature quality information may be utilized to locate a block of pixels in a subsequent image that corresponds to the feature. For example, the feature quality information may be utilized to determine whether a block of pixels that has a threshold amount of similarity to the feature actually corresponds to the feature.

19 Claims, 9 Drawing Sheets

FEATURE SEARCHING BASED ON FEATURE QUALITY INFORMATION

BACKGROUND

A growing number of people are using electronic devices, such as smart phones, tablets computers, laptop computers, portable media players, and so on. These individuals often use the electronic devices to consume content, purchase items, and interact with other individuals. In some instances, an electronic device is portable, allowing an individual to use the electronic device in different environments, such as a room, outdoors, a concert, etc. As more individuals use electronic devices, there is an increasing need to enable these individuals to interact with their electronic devices in relation to their environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
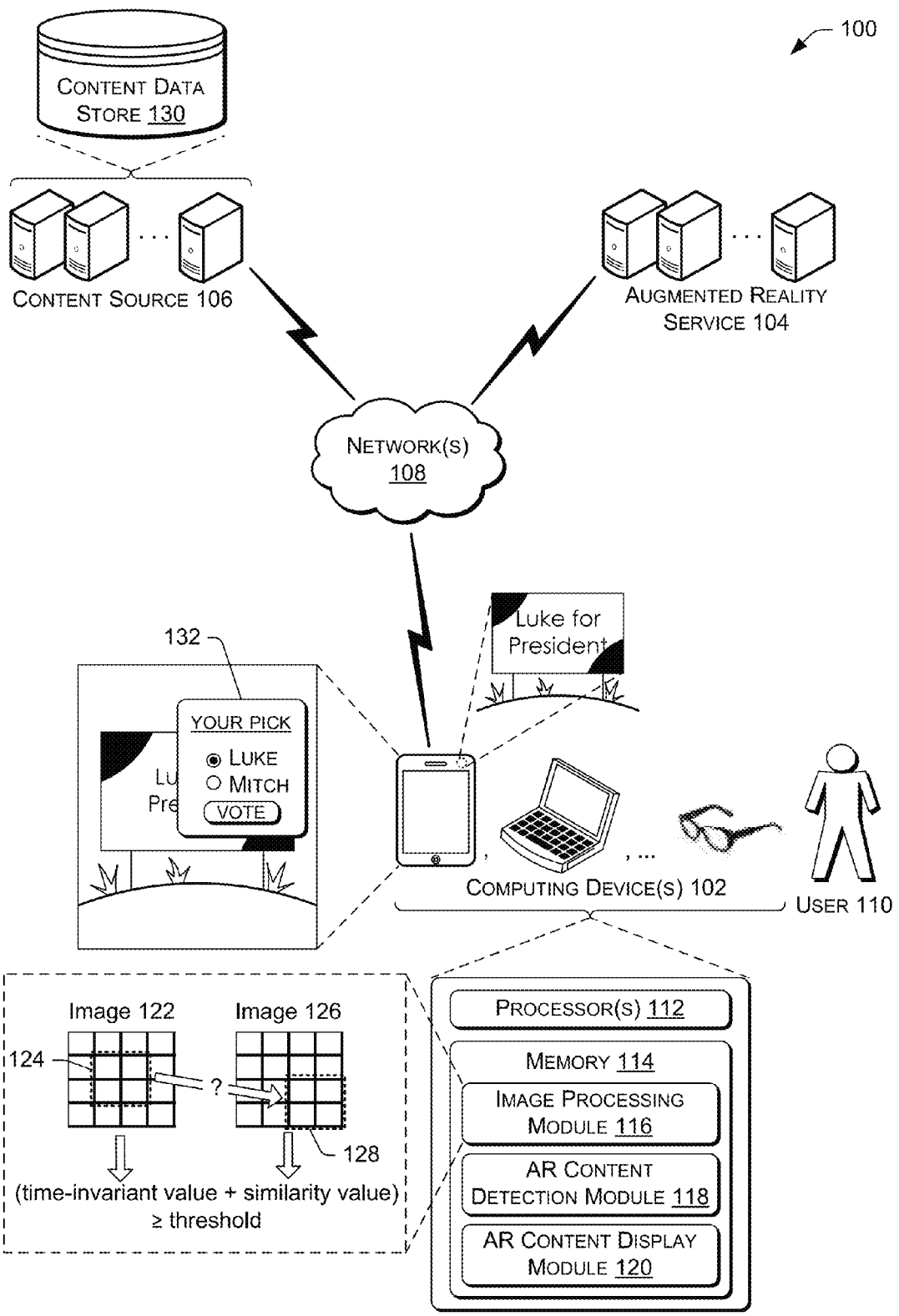
FIG. 1 illustrates an example architecture to search for a particular block of pixels in an image.

This application is related to "Feature Searching Along a Path of Increasing Similarity" (U.S. patent application Ser. No. 13/683,923) and "Pose Tracking through Analysis of an Image Pyramid" (U.S. patent application Ser. No. 13/683,902), filed concurrently herewith. The entire contents of both are incorporated herein by reference.

This disclosure describes architectures and techniques directed to, in part, searching for a particular block of pixels in an image based on feature quality information. In particular implementations, a user may use a portable device (e.g., a smart phone, tablet computer, etc.) to capture images of an environment, such as a room, outdoors, and so on. The images may be processed to identify a textured target in the environment (e.g., surface or portion of a surface) that is associated with augmented reality content. When such a textured target is identified, the augmented reality content may be displayed on the device in an overlaid manner on real-time images of the environment. The augmented reality content may be maintained on a display of the device in relation to the textured target as the device moves throughout the environment. To display the augmented reality content in relation to the textured target, the textured target may be tracked in the images by locating the same features of the textured target throughout the images.

To locate a feature of a textured target, a device may capture an initial image of an environment in which the device is located. The initial image may represent a textured target of the environment, such as a surface or portion of a surface in the environment. The initial image may be processed to detect features in the image and extract a block of pixels for each of the features (e.g., feature descriptors). A feature may generally comprise a point of interest in the image, such as a corner, edge, blob, or ridge.

The device may then generate feature quality information for each of the features of the initial image. The feature quality information may generally indicate a quality of a feature with respect to the initial image. To generate feature quality information for a feature, the device may generate similarity values indicating similarities of blocks of pixels of the initial image to a block of pixels that represents the feature. The device may then identify characteristics of the similarity values. The characteristics may include an average similarity value, a largest similarity value of blocks of pixels that are located relatively close to the feature, a second largest similarity value of blocks of pixels that are located within a particular range to the feature, and/or an average similarity value of blocks of pixels located along a path of greatest similarity to the feature. With the characteristics of the similarity values as inputs, the device may utilize machine learning to generate the feature quality information.

Thereafter, the device may utilize the feature quality information to find a block of pixels in a subsequent image that corresponds to the feature of the initial image. For example, the device may search the subsequent image for a block of pixels that has a threshold amount of similarity to the feature of the initial image (e.g., a block of pixels that represents the feature). Based on the feature quality information, the device may determine whether the block of pixels of the subsequent image actually corresponds to the feature of the initial image. In one example, the feature quality information comprises a time-invariant value and the block of pixels of the subsequent image corresponds to the feature when a sum of the time-invariant value and a similarity of the block of pixels of the subsequent image to the feature of the initial image is greater than a threshold. The feature quality information may be utilized in a similar manner to determine whether blocks of pixels in other subsequent images actually corresponds to the feature of the initial image.

In some instances, the device may utilize a block of pixels in the subsequent image that actually corresponds to a feature of the initial image to process an associated textured target represented in the subsequent image. For example, the device may utilize the block of pixels of the subsequent image to track a location of the textured target, identify a pose of the textured target, and/or determine a velocity of the textured target relative to the device.

By utilizing the techniques described herein, a feature may be intelligently located throughout multiple images. For example, through use of feature quality information for a feature in an initial image, the same feature may be accurately found in one or more subsequent images. Further, by utilizing feature quality information that does not vary in time, processing time associated with regenerating feature quality information may be avoided. Moreover, by accurately finding features that are associated with a textured target, augmented reality content may be displayed in relation to the textured target, creating a perception that the content is part of an environment.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. In particular, the architecture 100 includes one or more computing devices 102 (hereinafter the device 102) configured to communicate with an Augmented Reality (AR) service 104 and a content source 106 over a network(s) 108. The device 102 may augment a reality of a user 110 associated with the device 102 by modifying the environment that is perceived by the user 110. In many examples described herein, the device 102 augments the reality of the user 110 by modifying a visual perception of the environment, such as by adding visual content. However, the device 102 may additionally, or alternatively, modify other sense perceptions of the environment, such as a taste, sound, touch, and/or smell.

The device 102 may be implemented as, for example, a laptop computer, a desktop computer, a smart phone, an electronic reader device, a mobile handset, a personal digital assistant (PDA), a portable navigation device, a portable gaming device, a tablet computer, a watch, a portable media player, a hearing aid, a pair of glasses or contacts having computing capabilities, a transparent or semi-transparent glass having computing capabilities (e.g., heads-up display system), another client device, and the like. In some instances, when the device 102 is at least partly implemented by glass, such as a pair of glasses, contacts, or a heads-up display, computing resources (e.g., processor, memory, etc.) may be located in close proximity to the glass, such as within a frame of the glasses. Further, in some instance when the device 102 is at least partly implemented by glass, images (e.g., video or still images) may be projected or otherwise provided on the glass for perception by the user 110.

The device 102 may be equipped with one or more processors 112 and memory 114. The memory 114 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated, the memory 114 may include an image processing module 116, an AR content detection module 118, and an AR content display module 120.

The image processing module 116 may be configured to process one or more images of an environment in which the device 102 is located. The image processing module 116 may generally locate a same feature of a textured target throughout multiple images. In some instances, an image may comprise blocks of pixels that are relatively similar to each other, such as images including text, lines, or other similar elements. Accordingly, there may be blocks of pixels in the image that are relatively similar to an extracted block of pixels that represents a feature, making it difficult to locate the feature in subsequent images. In order to accurately locate the feature of the initial image in subsequent images, the module 116 may generate feature quality information for the feature with respect to the initial image. The feature quality information may indicate a quality of the feature. This information may enable the feature to be accurately located in subsequent images.

To generate feature quality information, the module 116 may detect a feature in an image 122 (e.g., initial image) and extract a block of pixels 124 that represents the feature. The module 116 may then generate a time-invariant value (e.g., feature quality information) that indicates a quality of the feature (e.g., a uniqueness of the feature with respect to blocks of pixels of the image 122). Thereafter, the module 116 may search in an image 126 (e.g., subsequent image) for a block of pixels that appears to match the block of pixels 124 (e.g., has a threshold amount of similarity to the block of pixels 124). As illustrated, a block of pixels 128 appears to match the block of pixels 124. Upon finding the block of pixels 128, the module 116 may utilize the time-invariant value to determine whether the block of pixels 128 actually matches the block of pixels 124. For instance, the block of pixels 128 may match the block of pixels 124 when a sum of the time-invariant value and a similarity value of the block of pixels 128 to the block of pixels 124 is greater than or equal to a threshold. When such condition is met, the block of pixels 128 may be flagged as corresponding to the block of pixels 124. Further details of the image processing module 116 will be discussed below in reference to FIGS. 2 and 4A-4B.

The AR content detection module 118 may be configured to detect AR content that is associated with an environment of the device 102. The module 118 may generally trigger the creation of an AR experience when one or more criteria are satisfied, such as detecting that the device 102 is located within a predetermined proximity to a geographical location that is associated with AR content and/or detecting that the device 102 is imaging a textured target that is associated with AR content. Further details of the AR content detection module 118 will be discussed below in reference to FIG. 2.

The AR content display module 120 may be configured to control display of AR content on the device 102. The module 120 may generally cause AR content to be displayed in relation to a real-time image of a textured target in the environment. For example, the module 120 may cause the AR content to be displayed in an overlaid manner on the textured target. By displaying AR content in relation to a textured target, the module 120 may create a perception that the content is part of an environment in which the textured target is located. Further details of the AR content display module 120 will be discussed below in reference to FIG. 2.

Although the modules 116-120 are illustrated in the example architecture 100 as being included in the device 102, in some instances one or more of these modules may be included in the AR service 104. In these instances, the device 102 may communicate with the AR service 104 (e.g., send captured images, etc.) so that the AR service 104 may execute the operations of the modules 116-120. In one example, the AR service 104 is implemented as a remote processing resource in a cloud computing environment with the device 102 merely capturing and displaying images.

The memory 114 (and all other memory described herein) may include one or a combination of computer readable storage media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

The AR service 104 may generally assist in creating an AR experience through the device 102. For example, the AR service 104 may receive feature descriptors obtained through image processing at the device 102. A feature descriptor may generally describe a detected feature of an image, such as a block of pixels centered on the feature. The AR service 104 may compare a received feature descriptor with a library of feature descriptors for different textured targets to identify a textured target that is represented by the feature descriptor. Upon identifying a textured target, the AR service 104 may determine whether or not the textured target is associated with AR content. When AR content is identified, the service 104 may inform the device 102 that AR content is available and/or send the AR content to the device 102. Although the AR service 104 is illustrated in the example architecture 100, in some instances the AR service 104 may be eliminated entirely, such as when all processing is performed locally at the device 102.

Meanwhile, the content source 106 may generally manage content stored in a content data store 130. The content may include any type of content, such as images, videos, interface elements (e.g., menus, buttons, etc.), and so on, that may be used to create an AR experience. As such, the content may be referred to herein as AR content. In some instances, the content is provided to the AR service 104 to be stored at the AR service 104 and/or sent to the device 102. Alternatively, or additionally, the content source 106 may provide content directly to the device 102. In one example, the AR service 104 sends a request to the content source 106 to send the content to the device 102. Although the content data store 130 is illustrated in the architecture 100 as included in the content source 106, in some instances the content data store 130 is included in the AR service 104 and/or the device 102 and the content source 106 is eliminated entirely.

In some examples, the content source 106 comprises a third party source associated with electronic commerce, such as an online retailer offering items for acquisition (e.g., purchase). As used herein, an item may comprise a tangible item, intangible item, product, good, service, bundle of items, digital good, digital item, digital service, coupon, and the like. In one instance, the content source 106 offers digital items for acquisitions, including digital audio and video. Further, in some examples the content source 106 may be more directly associated with the AR service 104, such as a computing device acquired specifically for AR content and that is located proximately or remotely to the AR service 104. In yet further examples, the content source 106 may comprise a social networking service, such as an online service facilitating social relationships.

The AR service 104 and/or content source 106 may be implemented as one or more computing devices, such as one or more servers, laptop computers, desktop computers, and the like. In one example, the AR service 104 and/or content source 106 includes computing devices configured in a cluster, data center, cloud computing environment, or a combination thereof.

As noted above, the device 102, AR service 104, and/or content source 106 may communicate via the network(s) 108. The network(s) 108 may include any one or combination of multiple different types of networks, such as cellular networks, wireless networks, Local Area Networks (LANs), Wide Area Networks (WANs), and the Internet.

In one non-limiting example of the architecture 100, the user 110 may operate the device 102 to capture an initial image of a "Luke for President" poster (e.g., textured target). The device 102 may then process the initial image to detect a feature that will be used for tracking the textured target throughout other images. The device 102 may use a feature descriptor describing the feature to recognize the poster and find AR content. In this example, an interface element 132 (e.g., a menu) is identified as being associated with the poster. The device 102 may also generate a time-invariant value indicating a quality of the feature.

The device 102 then captures a subsequent image of the "Luke for President" poster and analyzes the subsequent image to locate a block of pixels that has a threshold amount of similarity to the feature of the initial image. When such a block of pixels is found, the device 102 may utilize the time-invariant value to determine if the block of pixels in the subsequent image actually corresponds to the block of pixels in the initial image. If the block in the subsequent image is determined to correspond to the block in the initial image, the block of pixels may be flagged as a correct match.

The device 102 may utilize one or more blocks of pixels in the subsequent image that correspond to one or more features in the initial image to determine a location of the poster. With the location, the device 102 may display the interface element 132 in relation to the poster, such as in an overlaid manner on the poster, to create a perception that the interface element 132 is located within the environment. Through the interface element 132 the user 110 may interact with the environment, such as by indicating who he will vote for as president.

Example Computing Device

Figure 2:
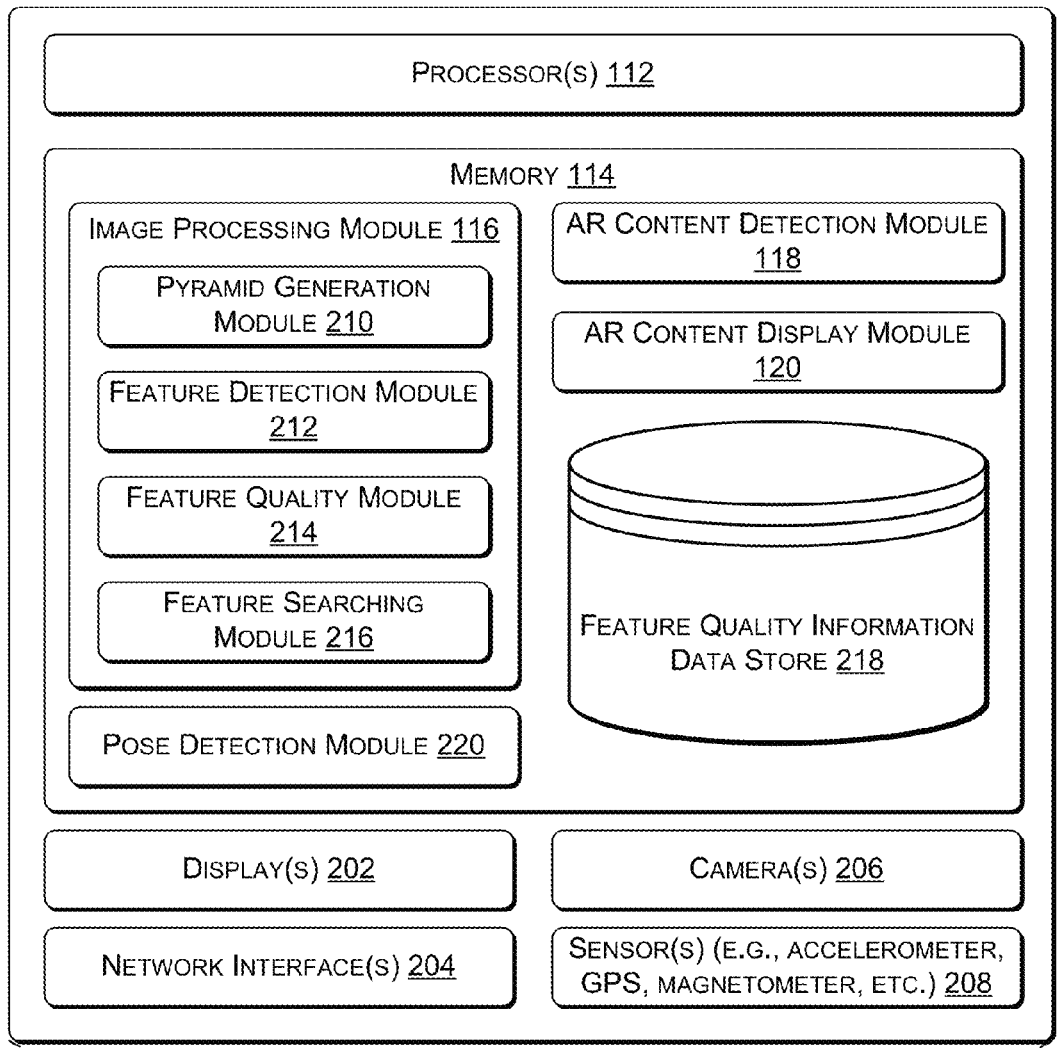
FIG. 2 illustrates further details of the example computing device of FIG. 1.

FIG. 2 illustrates further details of the example computing device 102 of FIG. 1. As noted above, the device 102 may generally augment a reality of a user by modifying an environment in which the user is located. In some instances, the device 102 may augment the reality of the user through the assistance of the AR service 104 and/or content source 106, while in other instances the device 102 may operate independent of the AR service 104 and/or content source 106 (e.g., perform processing locally, obtain locally stored content, etc.).

The device 102 may include the one or more processors 112, the memory 114, one or more displays 202, one or more network interfaces 204, one or more cameras 206, and one or more sensors 208. In some instances, the one or more displays 202 are implemented as one or more touch screens. The one or more cameras 206 may include a front facing camera and/or a rear facing camera. The one or more sensors 208 may include an accelerometer, compass, gyroscope, magnetometer, Global Positioning System (GPS), olfactory sensor (e.g., for smell), microphone (e.g., for sound), tactile sensor (e.g., for touch), or other sensor.

As noted above, the memory 114 may include the image processing module 116 configured to process one or more images, such as video images. The image processing module 116 may include a pyramid generation module 210, a feature detection module 212, a feature quality module 214, and a feature searching module 216. The modules 210-216 may operate in conjunction with each other to perform various computer vision operations on images from an environment in which the device 102 is located.

The pyramid generation module 210 may be configured to sub-sample and/or smooth an image to create a pyramid representation of the image. A pyramid representation may generally comprise a plurality of image layers that represent an image at different pixel resolutions. In one example, an image is represented by a pyramid that includes four image layers, however, in other examples the image may be represented by other numbers of image layers.

The pyramid generation module 210 may also be configured to generate feature relation information describing relations between features on different image layers of an image. The module 210 may associate a parent feature on a lower resolution image layer with a feature on a higher resolution image layer that is located within a predetermined proximity to the parent feature. The feature on the higher resolution image layer may be a child feature to the parent feature. As such, the child feature may represent the parent feature at a higher resolution. Upon associating parent and child features, the module 210 may generate feature relation information indicating a location of the child feature in relation to a location of the parent feature. The feature relation information may be represented in various forms, such as a vector, coordinate point(s), and so on. In one example, a vector is used having a magnitude that corresponds to a distance between the parent feature to the child feature and having a direction from the parent feature to the child feature. The feature relation information may be generated upon detecting features in different image layers of an image by the feature detection module 212.

In some instances, the pyramid generation module 210 may also transform feature relation information by modifying a scale and/or orientation of the feature relation information. As the device 102 moves relative to a textured target, a feature associated with the textured target may change in scale and/or orientation as the feature is located in different images. To utilize feature relation information (e.g., a vector) generated for an initial image in a subsequent image, the feature relation information may be modified in scale and/or orientation.

The feature detection module 212 may analyze an image to detect features in the image. The features may correspond to points of interest in the image, such as a corner, edge, blob, or ridge. In instances where an image is represented by a pyramid representation, the module 212 may detect features in one or more image layers of the pyramid representation. To detect features in an image, the module 212 may utilize one or more feature detection and/or description algorithms commonly known to those of ordinary skill in the art, such as FAST, SIFT, SURF, or ORB. Once a feature has been detected, the detection module 212 may extract or generate a feature descriptor describing the feature, such as a patch of pixels (block of pixels).

The feature quality module 214 may be configured to generate quality information for a feature of an image. The quality information may indicate a quality of the feature with respect to blocks of pixels of the image (e.g., a uniqueness of a feature). In some instances, the quality information may comprise a time-invariant value that may be utilized to find the feature in subsequent images. The quality information may be generated once for a feature with respect to an initial image and used in subsequent images as a constant value. Feature quality information may be generated for each detected feature in an image.

To generate feature quality information for a feature, the feature quality module 214 may generate similarity values for blocks of pixels in an image. Each similarity value may indicate a similarity of a block of pixels in the image to a block of pixels in the image that represents a feature. In some instances, a similarity value may be referred to as a "self-similarity" value. The module 214 may then identify characteristics of the similarity values. The characteristics may include an average similarity value for the similarity values, a largest similarity value of blocks of pixels that are located relatively close to the feature, a second largest similarity value of blocks of pixels that are located within a particular range to the feature, and/or an average similarity value of blocks of pixels located along a path of greatest similarity to the feature. With the characteristics of the similarity values as inputs, the module 214 may utilize machine learning to generate the feature quality information. In some instances, the machine learning may comprise logistic regression or other similar techniques. The feature quality information may be stored in a feature quality information data store 218.

The feature searching module 216 may be configured to search an image or image layer to identify (e.g., find) a particular feature (e.g., block of pixels). The module 216 may generally begin searching within a subsequent image or image layer to find a block of pixels that has a threshold amount of similarity to a block of pixels of an initial image (e.g., feature of initial image). When such a block of pixels is found, the module 216 may utilize feature quality information to determine whether the block of pixels actually corresponds to the block of pixels of the initial image. Further details of the feature searching module 216 will be discussed below in reference to FIGS. 4A-4B.

The memory 114 may also include a pose detection module 220 configured to detect a pose of a textured target. A textured target may generally comprise a surface or a portion of a surface within an environment that has one or more textured characteristics. The module 220 may utilize features of an image to determine a pose of a textured target with respect to that image. For example, upon identifying multiple features in an image that represents a textured target, the module 220 may utilize locations of the multiple features to determine a pose of the textured target with respect to that image. The pose may generally indicate an orientation and/or position of the textured target within the environment with respect to a reference point, such as the device 102. The pose may be represented by various coordinate systems (e.g., x, y, z), angles, points, and so on. Although other techniques may be used, in some instances the module 220 determines a pose of a textured target by solving the Perspective-n-Point (PnP) problem, which is generally known by those of ordinary skill in the art.

The AR content detection module 118 may detect AR content that is associated with an environment of the device 102. The module 118 may generally perform an optical and/or geo-location analysis of an environment to find AR content that is associated with the environment. When the analysis indicates that one or more criteria are satisfied, the module 118 may trigger the creation of an AR experience (e.g., cause AR content to be displayed), as discussed below.

In a geo-location analysis, the module 118 primarily relies on a reading from the sensor 208 to trigger the creation of an AR experience, such as a GPS reading. For example, the module 118 may reference the sensor 208 and trigger an AR experience when the device 102 is located within a predetermined proximity to and/or is imaging a geographical location that is associated with AR content.

In an optical analysis, the module 118 primarily relies on optically captured signal to trigger the creation of an AR experience. The optically captured signal may include, for example, a still or video image from a camera, information from a range camera, LIDAR detector information, and so on. For example, the module 118 may analyze an image of an environment in which the device 102 is located and trigger an AR experience when the device 102 is imaging a textured target, object, or light oscillation pattern that is associated with AR content. In some instances, a textured target may comprise a fiduciary marker. A fiduciary marker may generally comprise a mark that has a particular shape, such as a square or rectangle. In many instances, the content to be augmented is included within the fiduciary marker as an image having a particular pattern (Quick Augmented Reality (QAR) or QR code).

In some instances, the AR content detection module 118 may utilize a combination of a geo-location analysis and an optical analysis to trigger the creation of an AR experience. For example, upon identify a textured target through analysis of an image, the module 118 may determine a geographical location being imaged or a geographical location of the device 102 to confirm the identity of the textured target. To illustrate, the device 102 may capture an image of the Statue of Liberty and process the image to identity the Statue. The device 102 may then confirm the identity of the Statue by referencing geographical location information of the device 102 or of the image.

In some instances, the AR content detection module 118 may communicate with the AR service 104 to detect AR content that is associated with an environment. For example, upon detecting features in an image through the feature detection module 212, the module 118 may send feature descriptors for those features to the AR service 104 for analysis (e.g., to identify a textured target and possibly identify content associated with the textured target). When a textured target for those feature descriptors is associated with AR content, the AR service 104 may inform the module 118 that such content is available. Although the AR service 104 may generally identify a textured target and content associated with the target, in some instances this processing may be performed at the module 118 without the assistance of the AR service 104.

The AR content display module 120 may control the display of AR content on the display 202 to create a perception that the content is part of an environment. The module 120 may generally cause the AR content to be displayed in relation to a textured target in the environment. For example, the AR content may be displayed in an overlaid manner on a substantially real-time image of the textured target. As the device 102 moves relative to the textured target, the module 120 may update a displayed location, orientation, and/or scale of the content so that the content maintains a relation to the textured target. In some instances, the module 120 utilizes a pose of the textured target to display the AR content in relation to the textured target.

Example Augmented Reality Service

Figure 3:
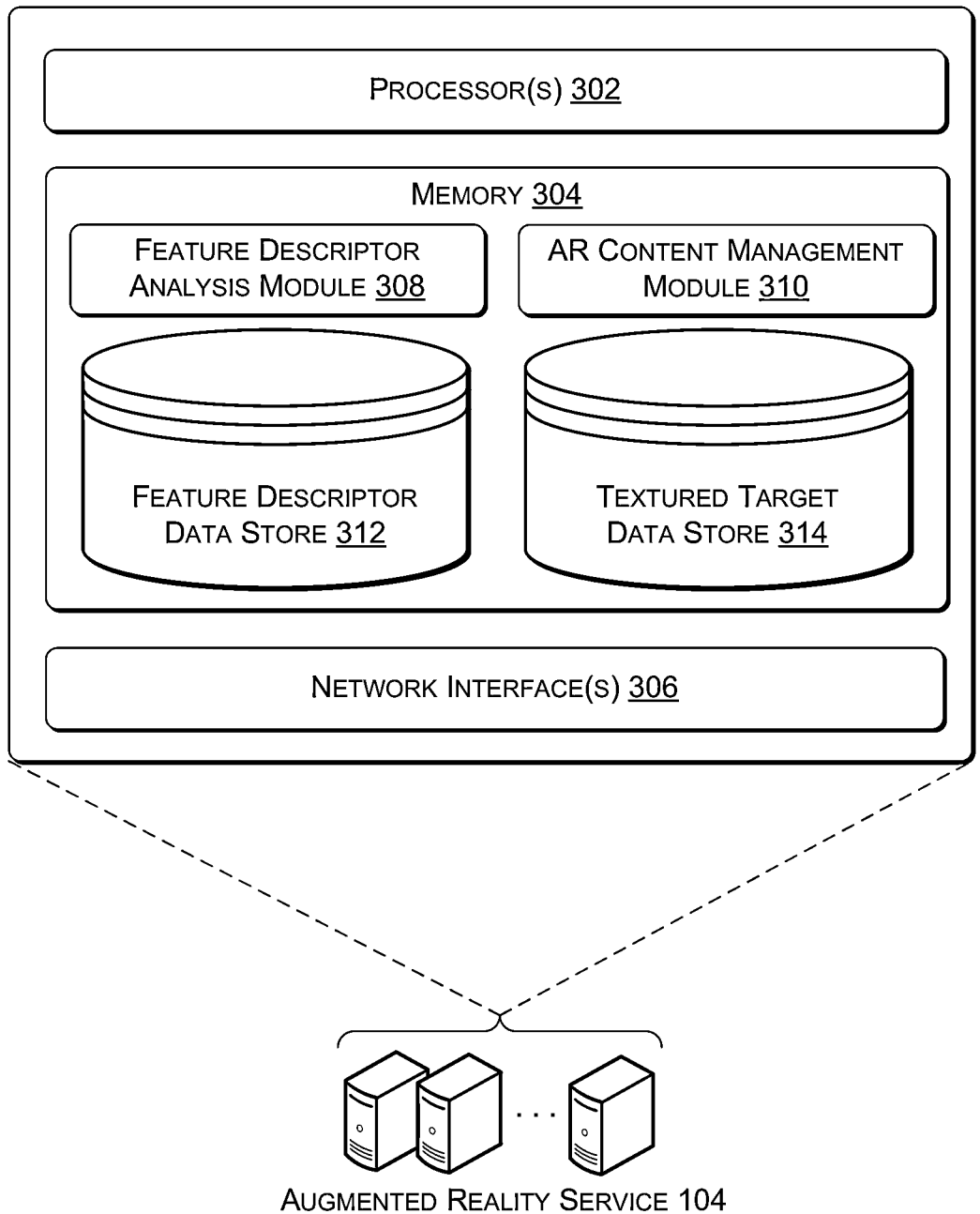
FIG. 3 illustrates additional details of the example augmented reality service of FIG. 1.

FIG. 3 illustrates additional details of the example AR service 104 of FIG. 1. The AR service 104 may include one or more computing devices that are each equipped with one or more processors 302, memory 304, and one or more network interfaces 306. As noted above, the one or more computing devices of the AR service 104 may be configured in a cluster, data center, cloud computing environment, or a combination thereof. In one example, the AR service 104 provides cloud computing resources, including computational resources, storage resources, and the like in a cloud environment.

As similarly discussed above with respect to the memory 114, the memory 304 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). In the example AR service 104, the memory 304 includes a feature descriptor analysis module 308 and an AR content management module 310.

The feature analysis module 308 is configured to analyze one or more feature descriptors to identify a textured target. For example, the analysis module 308 may compare a feature descriptor received from the device 102 with a library of feature descriptors of different textured targets stored in a feature descriptor data store 312 to identify a textured target that is represented by the feature descriptor. The feature descriptor data store 312 may provide a link between a textured target and one or more feature descriptors. For example, the feature descriptor date store 312 may indicate one or more feature descriptors (e.g., blocks of pixels) that are associated with the "Luke for President" poster.

The AR content management module 310 is configured to perform various operations for managing AR content. The module 310 may generally facilitate creation and/or identification of AR content. For example, the module 310 may provide an interface to enable users, such as authors, publishers, artists, distributors, advertisers, and so on, to create an association between a textured target and content. An association between a textured target and content may be stored in a textured target data store 314. In some instances, the AR content management module 310 may aggregate information from a plurality of devices and generate AR content based on the aggregated information. The information may comprise input from users of the plurality of devices indicating an opinion of the users, such as polling information.

The module 310 may also determine whether content is associated with a textured target. For instance, upon identifying a textured target within an environment (through analysis of a feature descriptor as described above), the module 310 may reference the associations stored in the textured target data store 314 to find AR content. To illustrate, Luke may register a campaign schedule with his "Luke for President" poster by uploading an image of his poster and his campaign schedule. Thereafter, when the user 110 views the poster through the device 102, the module 310 may identify this association and provide the schedule to the device 102 for consumption as AR content.

Additionally, or alternatively, the module 310 may modify AR content based on a geographical location of the device 102, profile information of the user 110, or other information. To illustrate, suppose the user 110 is at a concert for a band and captures an image of a CD that is being offered for sale. Upon recognizing the CD through analysis of the image with the feature descriptor analysis module 308, the module 310 may determine that an item detail page for a t-shirt of the band is associated the CD. In this example, the band has indicated that the t-shirt may be sold for a discounted price at the concert. Thus, before the item detail page is sent to the device 102 for display as AR content, the list price on the item detail page may be updated to reflect the discount. To add to this illustration, suppose that profile information of the user 110 is made available to the AR service 104 through the express authorization of the user 110. If, for instance, a further discount is provided for a particular gender (e.g., due to decreased sales for the particular gender), the list price of the t-shirt may be updated to reflect this further discount.

Example Process

Figure 4A:
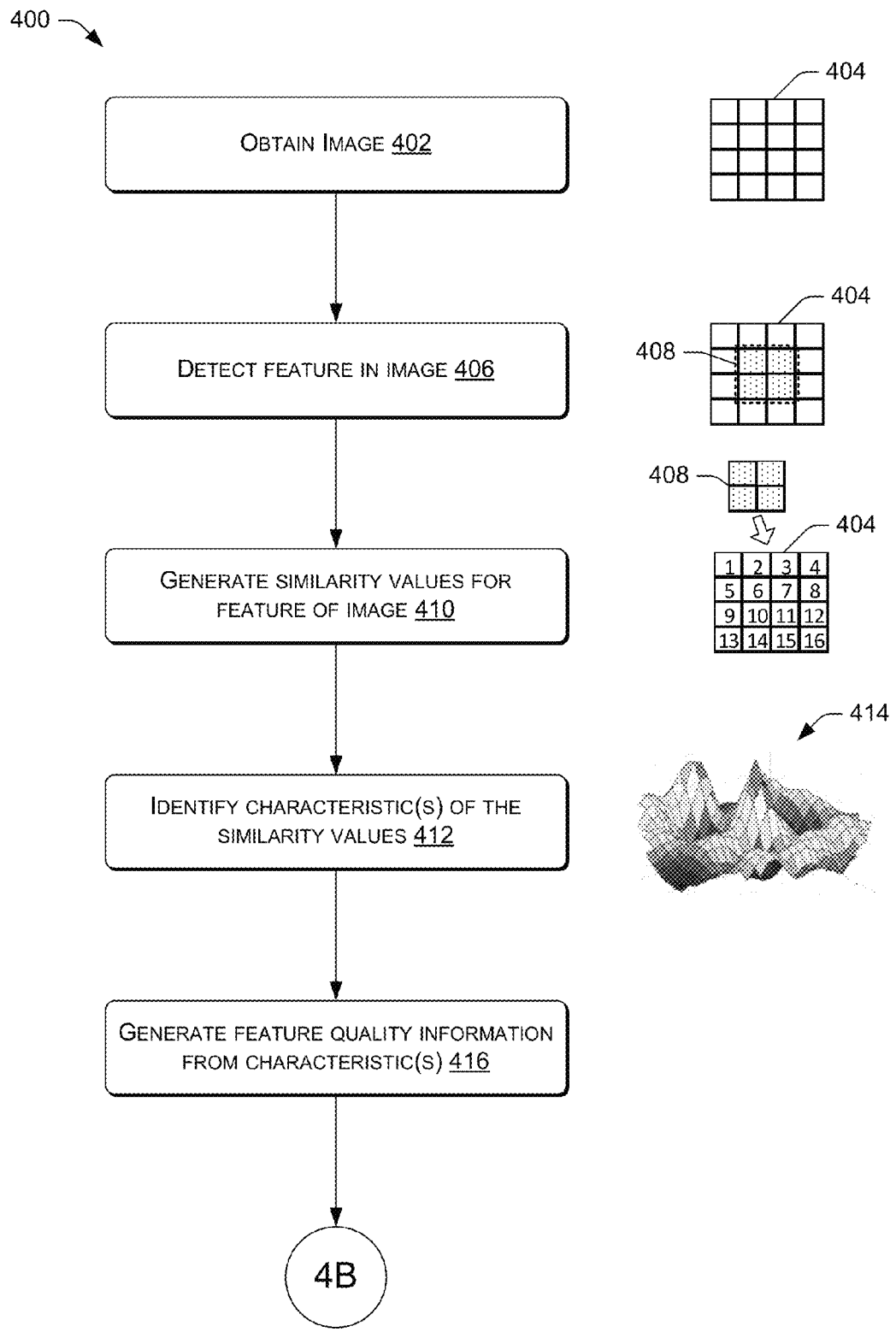
FIGS. 4A-4B illustrates an example process to generate feature quality information for a feature in an image and use the feature quality information to find the feature in another image.
Figure 4B:
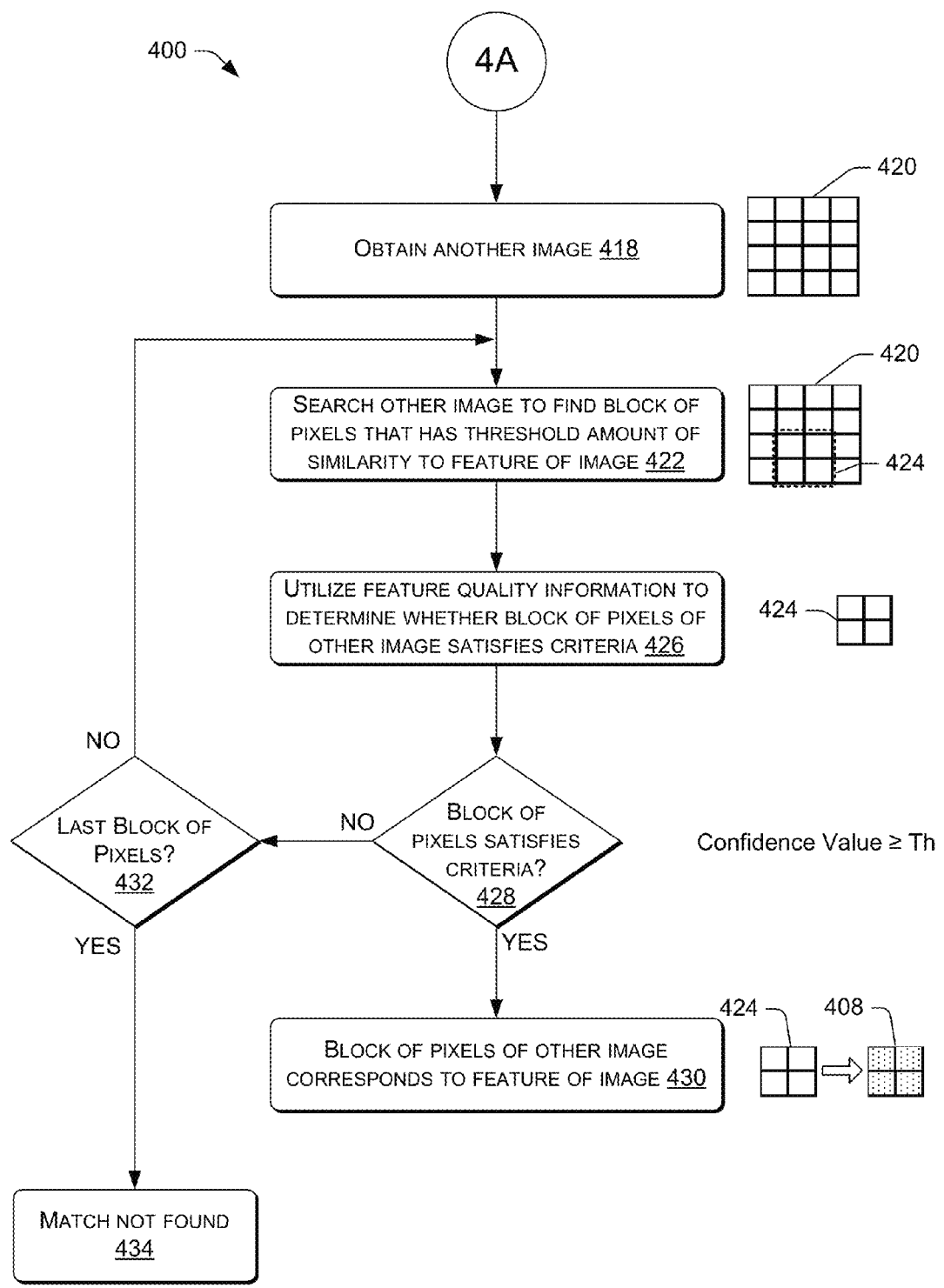

FIGS. 4A-4B illustrate an example process 400 for employing the techniques described herein. In particular, the process 400 may generate feature quality information for a feature in an image and use the feature quality information to find the feature in another image. For ease of illustration, the process 400 is described as being performed by the device 102 in the architecture 100 of FIG. 1. However, the process 400 may alternatively, or additionally, be performed by the AR service 104 and/or another device. Further, the process 400 may be performed in other architectures, and the architecture 100 may be used to perform other processes.

The process 400 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, any number of the described operations may be omitted.

In FIG. 4A, at 402, the device 102 may obtain an image 404. The image 404 may be obtained by capturing the image 404 with a camera of the device 102 or otherwise receiving the image 404. At 406, the device 102 may process the image 404 to detect a feature in the image 404. Upon detecting the feature, a block of pixels 408 may be extracted to represent the feature (e.g., feature descriptor). Although a 4×4 block of pixels is extracted in this example, it should be understood that the extracted block of pixels may take any form (e.g., any number of pixels/dimensions).

At 410, the device 102 may generate similarity values for different blocks of pixels in the image 404. A similarity value may generally indicate how similar (e.g., based on pixel values) a block of pixels is to a reference block of pixels, in this example the block of pixels 408. A similarity value may be generated by comparing a block of pixels of the image 404 to the block of pixels 408. To illustrate, the device 102 may calculate a similarity value for a 4×4 block of pixels centered on pixel 6 by comparing the block of pixels 408 to the 4×4 block of pixels centered on pixel 6. Likewise, the device 102 may calculate similarity values for blocks of pixels centered on pixels 1-5 and 7-16 of the image 404. A similarity value may be represented at a center pixel of a block of pixels (e.g., the pixel 6 for the block of pixels centered on pixel 6). When, as in the example of FIG. 4A, a block of pixels does not include a pixel that is located directly at a center location, a particular pixel may be designated as a center pixel. To illustrate, if an upper-right hand pixel of a block of pixels is designated as a center pixel, a block of pixels comprising pixels 5, 6, 9, and 10 may be said to be centered on pixel 6. In some instances, a similarity value may comprise a normalized cross correlation score.

At 412, the device 102 may identify one or more characteristics of the similarity values for a feature (e.g., for the block of pixels 408). For example, for the block of pixels 408, the device 102 may identify:
 an average similarity value of the similarity values for the block of pixels 408,
 a largest similarity value of blocks of pixels of the image 404 that are located at a predetermined distance to the block of pixels 408 (e.g., to the center pixel 7),
 a second largest similarity value of blocks of pixels of the image 404 that are located within a first predetermined distance to the block of pixels 408 (e.g., to the pixel 7) and that are located outside a second predetermined distance to the block of pixels 408 (e.g., to the center pixel 7), and/or
 an average similarity value of blocks of pixels of the image 404 that are located along a path in the image 404 of greatest similarity to the block of pixels 408, the path may begin at the block of pixels 408 (e.g., at the center pixel 7).

As illustrated in FIG. 4A, a visual representation 414 shows different similarity values for a feature and characteristics of those similarity values. Further details of the similarity values and characteristics will be discussed below with reference to FIGS. 5A-5E.

At 416, the device 102 may generate feature quality information from one or more characteristics of similarity values for a feature (e.g., for the block of pixels 408). In some instances, the feature quality information is generated through machine learning, such as logistic regression. The feature quality information may comprise a time-invariant value and/or may indicate a quality of a feature with respect to blocks of pixels of an image. To generate the feature quality information, the device 102 may input the one or more characteristics and a set of training data into a machine learning algorithm to determine a weighting constant for each of the one or more characteristics. The feature quality information (e.g., time-invariant value) may then be generated by multiplying each characteristic by its respective weighting constant and summing the one or more weighted characteristics. One example equation for calculating a time-invariant value (e.g., feature quality information) is provided below:

$$\text{time-invariant value} = x_1 c_1 + x_2 c_2 + \ldots x_n c_n,$$

where $x_1$ to $x_n$ represent the characteristics and constants $c_1$ to $c_n$ represent the respective weighting constants determined through machine learning (e.g., logistic regression).

In FIG. 4B, at 418, the device 102 may obtain another image (image 420). The image 420 may be obtained by capturing the image 420 with a camera of the device 102 or otherwise receiving the image 420. The image 420 may be captured subsequent to the image 408. In some instances, one or more images are captured in between the image 404 and the image 420, while in other instances the image 420 may be captured directly after the image 404.

At 422, the device 102 may search in the image 420 to find a block of pixels that has a threshold amount of similarity to the feature of image 404 (e.g., the block of pixels 408). As a textured target associated with the feature of image 404 moves relative to the device 102, due to movement of the textured target and/or the device 102, the feature of image 404 may be located at a different pixel location in the image 420. In order to track the feature, and associated textured target, the device 102 may search the image 420 for a block of pixels that best matches the block of pixels 408 representing the feature. The search may begin at a predicted location as to where the feature may be located in the image 420 and search sequentially through adjacent blocks of pixels (e.g., blocks of pixels positioned on adjacent center pixels) to find a block of pixels that has a threshold amount of similarity to the block of pixels 408. Such a block of pixels may be found when a block of pixels has a threshold similarity value to the block of pixels 408. As noted above, in some instances the similarity value may comprise a normalized cross correlation score. As illustrated in FIG. 4B, the device 102 has identified a block of pixels 424 as having a threshold amount of similarity to the block of pixels 408.

Upon finding the block of pixels 424, at 426, the device 102 may utilize the feature quality information to determine whether the block of pixels 424 satisfies one or more criteria. That is, the device 102 may determine whether the block of pixels 424 actually corresponds to the block of pixels 408 (e.g., matches the block of pixels close enough to determine that a match is actually found). To make such a determination, the device 102 may generate a confidence value for the block of pixels 424 by summing (i) the time-invariant value for the block of pixels 408 and (ii) a product of a weighting constant determined through machine learning and the similarity value of the block of pixels 424 to the block of pixels 408. In some instances, the weighting constant for the similarity value of the block of pixels 424 to the block of pixels 408 is computed at 416 through logistic regression. The sum may then be input to a function, such as the sigmoid function, to generate the confidence value for the block of pixels 424. One example equation for calculating the confidence value for the block of pixels 424 is provided below:

$$\text{confidence value} = \text{Function}(\text{time-invariant value} + \text{similarity value} * c_s),$$

where the time-invariant value indicates the quality of the block of pixels 408 with respect to the image 404, the similarity value indicates a similarity of the block of pixels 424 to the block of pixels 408, $c_s$ comprises the weighting constant for the similarity value of the block of pixels 424 to the block of pixels 408, and the Function comprises the sigmoid function.

At 428, the block of pixels 424 may satisfy the one or more criteria when the confidence value is greater than or equal to a threshold (e.g., 0.8). When the confidence value of the block of pixels is greater than or equal to the threshold, at 430, the device 102 may designate the block of pixels 424 as corresponding to the block of pixels 408. In other words, the device 102 may determine that the block of pixels 424 matches the block of pixels 408 with a particular degree of accuracy. Alternatively, when the confidence value of the block of pixels 424 is not greater than or equal to the threshold, the process 400 may proceed to 432 to determine whether or not the block of pixels is the last block of pixels of the image 420. That is, whether or not the device 102 has searched the entire image 420, or a particular portion of the image 420, and is processing the last block of pixels. If, the block of pixels is not the last block of pixels, the process 400 may return to the operation 422 to determine whether another block of pixels of the image 420 corresponds to the block of pixels 408. Alternatively, if, at 432, the block of pixels is the last block of pixels, then the device 102 may, at 434, determine that the block of pixels 408 (the feature) could not be found in the image 420 (e.g., no match was found).

Example Graphs of Similarity Values

FIGS. 5A-5E illustrate example 3D graphs of similarity values for different blocks of pixels in an image with respect to a reference block of pixels (e.g., a feature). Each graph may show an amount of similarity a block of pixels in an image (represented at a center pixel) has to a block of pixels representing a feature of the image. In each graph, the x-axis represents the position of a block of pixels along a horizontal position of the image (e.g., x-axis of image), the y-axis represents the position of the block of pixels along a vertical position of the image (e.g., y-axis of image), and the z-axis represents a similarity value of the block of pixels to the reference block of pixels. A block of pixels that has a relatively high similarity value may indicate that the block of pixels is a better match to a reference block of pixels than another block of pixels that has a relatively low similarity value. As noted above, in some instances a similarity value may comprise a normalized cross correlation score.

Figure 5A:
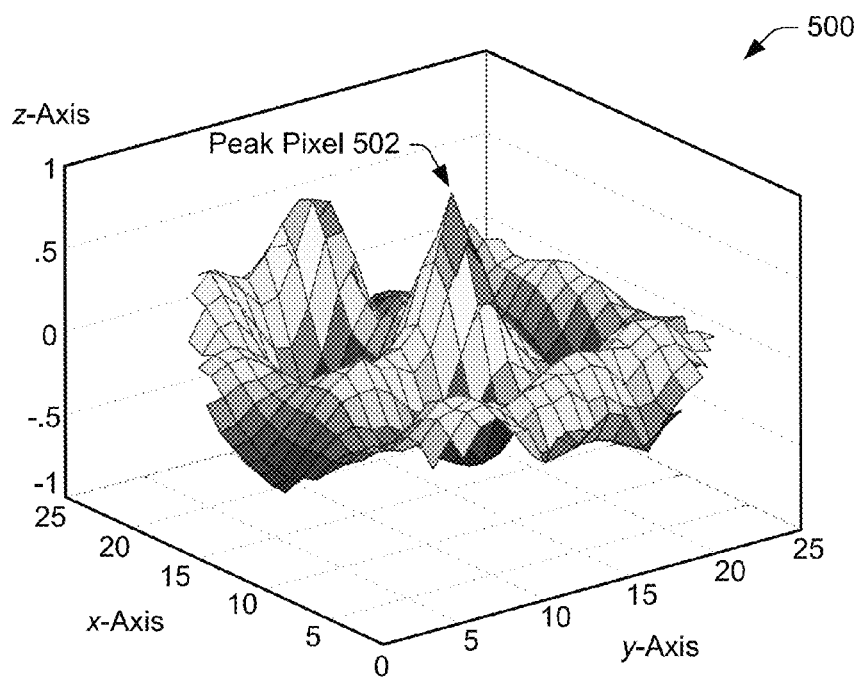
FIGS. 5A-5E illustrate example 3D graphs of similarity values for different blocks of pixels in an image with respect to a reference block of pixels.

FIG. 5A illustrates an example graph 500 showing similarity values for a feature that is relatively unique with respect to blocks of pixels in an image. In particular, the graph 500 shows similarity values for a block of pixels centered on a peak pixel 502 (e.g., block of pixels that represents the feature). The similarity values may be computed by comparing the block of pixels centered on the peak pixel 502 to blocks of pixels that are centered on respective pixels of the image. As illustrated by relatively high similarity value of the peak pixel 502, the block of pixels centered on the peak pixel 502 is a relatively good match to itself. Here, the characteristics of the similarity values for the feature may generally indicate, for example, that there is a relatively high peak at the peak pixel 502 and no surrounding peaks at the same similarity value. Accordingly, the feature quality information for the feature may indicate that the feature is a relatively high quality feature. That is, the feature may be located in other images with a relatively high degree of accuracy (e.g., the feature is easy to find). In one example, the graph 500 represents similarity values for a feature that comprises a relatively unique point of interest in an image, such as a particularly defined corner, etc.

Figure 5B:
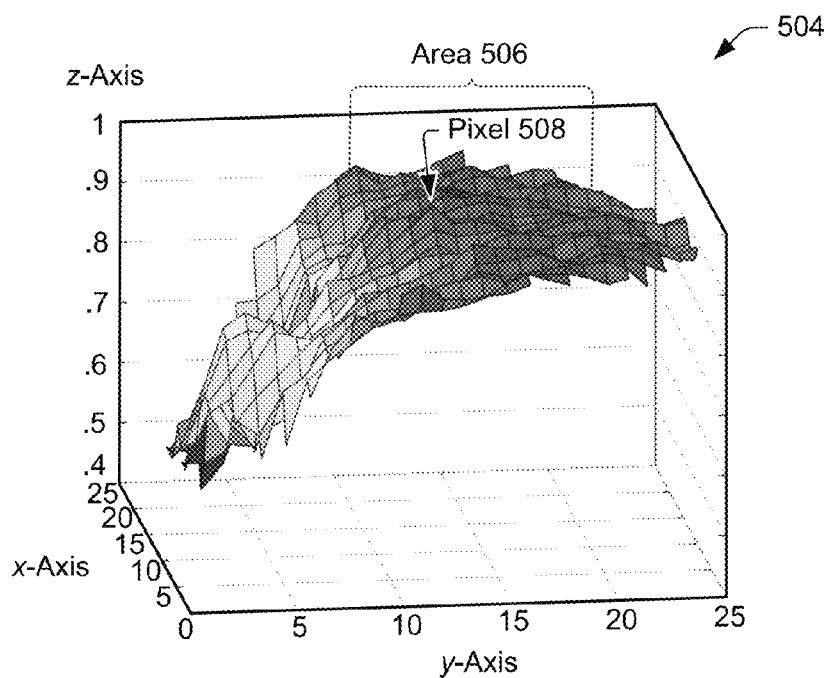

FIG. 5B illustrates an example graph 504 showing similarity values for a feature that is relatively similar to blocks of pixels in an area 506. In particular, the graph 504 shows similarity values for a block of pixels centered on pixel 508. As similarity discussed above with respect to FIG. 5A, the similarity values may be computed by comparing the block of pixels centered on the pixel 508 to blocks of pixels that are centered on respective pixels of the image. As illustrated by the similarity values in the area 506 that extends along the x-axis, the block of pixels centered on the pixel 508 is a relatively good match to multiple blocks of pixels in the image. That is, the blocks of pixels in the area 506 are relatively good matches to each other (e.g., pixel values in the area 506 change relatively little). This may make it relatively difficult to locate the block of pixels in subsequent images. In order to account for the example image of graph 504, the device 102 may identify a characteristic of the similarity values of the graph 504, namely an average similarity value. In this example, the average similarity value may be relatively high. The characteristic may be used to generate feature quality information usable to locate the feature in subsequent images. In one example, the image of the graph 504 may comprise multiple blocks of pixels that are relatively similar, such as an image of sand on a beach or a relatively blurry image.

Figure 5C:
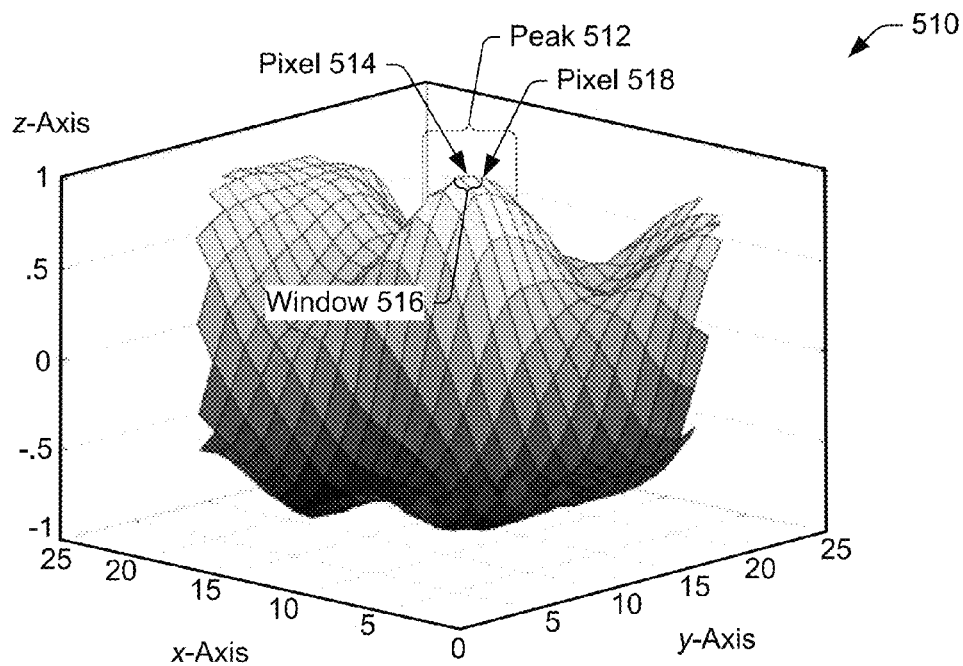

FIG. 5C illustrates an example graph 510 showing similarity values for a feature that is relatively similar to blocks of pixels on a peak 512. In particular, the graph 510 shows similarity values for a block of pixels centered on a pixel 514 (a highest point of the peak 512). Here, the peak 512 is relatively flat indicating that the block of pixels centered on the pixel 514 is relatively similar to other blocks of pixels on the peak 512. This may make it relatively difficult to locate the block of pixels in subsequent images. In order to account for the example image of graph 510, the device 102 may identify a characteristic of the similarity values, namely a largest similarity value of a block of pixels that is located at a predetermined distance to the block of pixels centered on the pixel 514. For example, the device 102 may identify a largest similarity value that is located outside a window 516 centered on the pixel 514. As illustrated, a block of pixels centered on a pixel 518 (located outside the window 516 and at a predetermined distance to the pixel 514) has a largest similarity value. The identified characteristic may be used to generate feature quality information usable to locate the feature in subsequent images. In one example, the image of the graph 510 may comprise multiple blocks of pixels that are relatively similar at a particular location, such as an image having a dot, an image having smooth circular features, or an image having a short line segment (blocks of pixels along with line segment would be relatively similar until the end of the line segment is reached, at which point the similarity would drop relatively quickly).

Figure 5D:
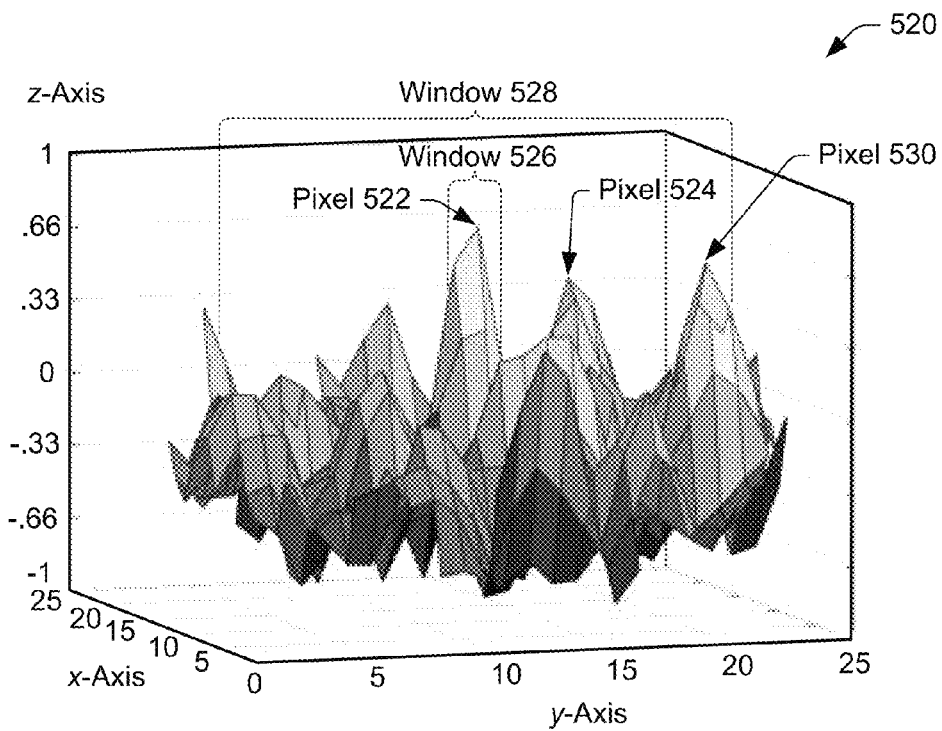

FIG. 5D illustrates an example graph 520 showing similarity values for a feature that is relatively similar to a block of pixels that is located in proximity to the feature. In particular, the graph 520 shows similarity values for a block of pixels centered on a pixel 522 (the feature). Here, the block of pixels centered on the pixel 522 may be relatively similar to a neighboring block of pixels centered on a pixel 524 (e.g., block of pixels located within a predetermined distance). This may make it difficult to locate the block of pixels centered on the pixel 522 in subsequent images, due to an incorrect match of the neighboring block of pixels. In order to account for the example image of graph 520, the device 102 may identify a characteristic of the similarity values, namely a second largest similarity value of a block of pixels that is a located within a first predetermined distance to the block of pixels centered on the pixel 522 and that is located outside a second predetermined distance to the block of pixels centered on the pixel 522. For example, the device 102 may identify the block of pixels centered on the pixel 524, which is outside a window 526 and within a window 528. As illustrated, the block of pixels centered on the pixel 524 has the second largest similarity value within this region and a block of pixels centered on a pixel 530 has a largest similarity value within this region. The identified characteristic may be used to generate feature quality information usable to locate the feature in subsequent images. In one example, the image of the graph 520 may comprise relatively similar blocks of pixels that are located in close proximity to each other with dissimilar blocks of pixels located in between, such as an image having text.

Figure 5E:
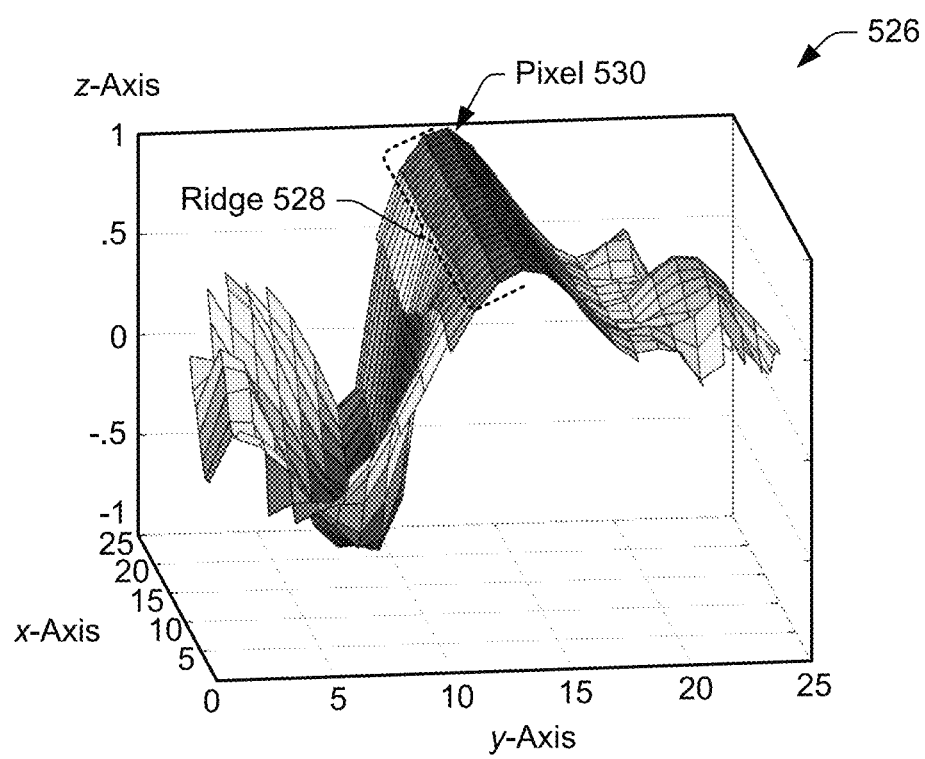

FIG. 5E illustrates an example graph 526 showing similarity values for a feature that is relatively similar to blocks of pixels along a ridge 528. In particular, the graph 526 shows similarity values for a block of pixels centered on a pixel 530 located on the ridge 528. As illustrated by the similarity values along the ridge 528, the block of pixels centered on the pixel 530 is an almost identical match to multiple blocks of pixels in the image. This may make it difficult to locate the block of pixels in subsequent images. In order to account for the example image of graph 526, the device 102 may identify a characteristic of the similarity values, namely a path of greatest similarity to the block of pixels centered on the pixel 530. In this example, the path may extend along the ridge 528 and/or may begin at the pixel 530 (the center pixel of the feature). The characteristic may be used to generate feature quality information usable to locate the feature in subsequent images. In one example, the image of the graph 526 may comprise multiple blocks of pixels that are relatively similarly along a particular path, such as an image having a line.

Example Path of Greatest Similarity

Figure 6:
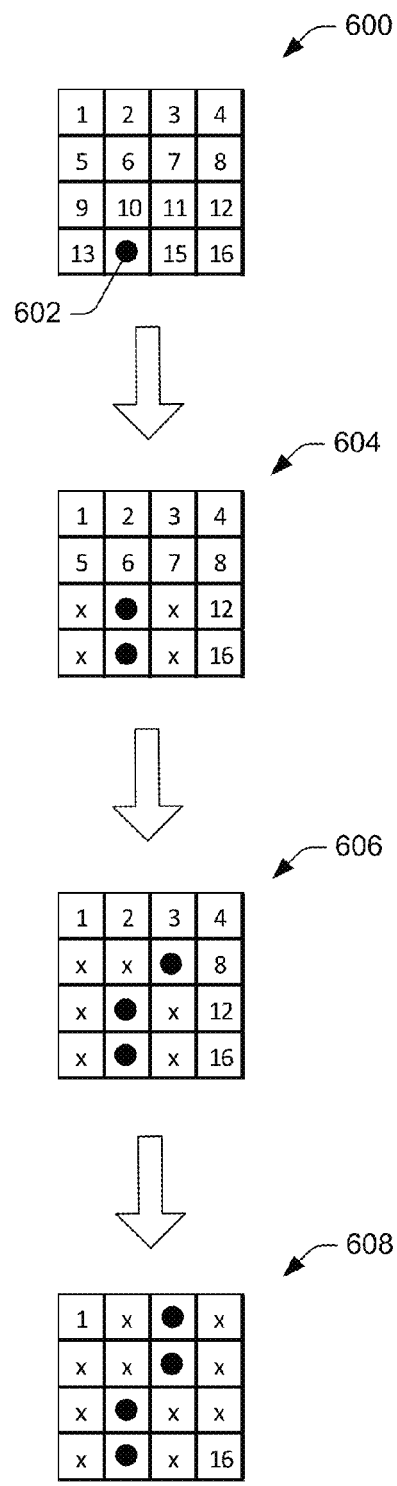
FIG. 6 illustrates an example process of identifying a path of greatest similarity to a reference block of pixels.

FIG. 6 illustrates an example process of identifying a path of greatest similarity to a reference block of pixels (e.g., a block of pixels representing a feature). The path may be used as a characteristic of similarity values to generate feature quality information for the reference block of pixels. In this example, the reference block of pixels comprises a 4×4 block of pixels.

At 600, the device 102 may search an image to find a block of pixels that has a threshold amount of similarity to the reference block of pixels. Such a block of pixels may be found when a similarity value between the block of pixels and the reference block of pixels is greater than a threshold. As noted above, a similarity value may be represented at a center pixel of a block of pixels. As illustrated at 600, the device 102 has identified a 4×4 block of pixels centered on a pixel 602 as having a threshold amount of similarity. Upon finding a block of pixels with a threshold amount of similarity, the device 102 may move pixel-by-pixel through the image to adjacent pixels of greatest similarity to the reference block of pixels, as discussed below.

Still at 600, the device 102 may search blocks of pixels centered on adjacent pixels 9-11, 13, 15 to find a block of pixels that has a largest amount of similarity to the reference block of pixels. In this example, the device 102 has identified a block of pixels centered on pixel 10 as having a largest amount of similarity to the reference block of pixels. Accordingly, at 604, the process may move to the pixel 10, as illustrated by the solid circle at pixel 10. Center pixels for blocks of pixels that have already been searched are marked with "x"s, as illustrated by the "x"s for pixels 9, 11, 13, and 15.

At 604, the device 102 may search pixels 5-7 that are adjacent to the pixel 10 and that have not been previously searched. That is, the device 102 may compare the reference block of pixel to blocks of pixels centered on pixels 5-7 to find a block of pixels that has a largest amount of similarity to the reference block of pixels from among the blocks of pixels centered on pixels 5-7. In this example, the device 102 has identified a block of pixels centered on pixel 7 as having a largest amount of similarity to the reference block of pixels. Accordingly, at 606, the device 102 may move to the pixel 7, as illustrated by the solid circle at pixel 7. As also illustrated at 606, the pixels 5 and 6 are marked with "x"s.

At 606, the device 102 may search blocks of pixels centered on pixels 2-4, 8, and 12 to find a block of pixels that has a largest amount of similarity to the reference block of pixels. Here, the device 102 has identified a block of pixels centered on pixel 3 as having a largest amount of similarity to the reference block of pixels from among the blocks of pixels centered on pixels 2-4, 8, and 12. The device 102 may move to pixel 3, as illustrated by the solid circle at 608. As such, the device 102 may move pixel-by-pixel to adjacent pixels along a path of greatest similarity to the reference block of pixels.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   under control of a computing device configured with computer-executable instructions,
   capturing, with a camera of the computing device, a first image of an environment in which the computing device is located;
   detecting a feature in the first image, the feature being represented by a particular block of pixels;

generating a similarity value for each of a plurality of blocks of pixels of the first image, each similarity value indicating a similarity of one of the plurality of blocks of pixels of the first image to the particular block of pixels of the first image;

identifying one or more characteristics of the similarity values for the plurality of blocks of pixels of the first image;

generating a time-invariant value from the one or more characteristics, the time-invariant value indicating a quality of the feature of the first image;

capturing a second image with the camera;

searching the second image to find a block of pixels that has a threshold amount of similarity to the particular block of pixels of the first image; and upon finding the block of pixels in the second image that has a threshold amount of similarity to the particular block of pixels of the first image, determining whether the block of pixels of the second image corresponds to the block of pixels of the first image based at least in part on the time-invariant value.

2. The method of claim 1, wherein the one or more characteristics of the similarity values of the plurality of blocks of pixels of the first image comprise an average similarity value of the similarity values of the plurality of blocks of pixels.

3. The method of claim 1, wherein the one or more characteristics of the similarity values of the plurality of blocks of pixels of the first image comprise a largest similarity value of blocks of pixels of the plurality of blocks of pixels that are located at a predetermined distance to the particular block of pixels.

4. The method of claim 1, wherein the one or more characteristics of the similarity values of the plurality of blocks of pixels of the first image comprise a second largest similarity value of blocks of pixels of the plurality of blocks of pixels of that are located within a first predetermined distance to the particular block of pixels and that are located outside a second predetermined distance to the particular block of pixels.

5. The method of claim 1, wherein the one or more characteristics of the similarity values of the plurality of blocks of pixels of the first image comprise an average similarity value of blocks of pixels of the plurality of blocks of pixels that are located along a path in the first image of greatest similarity to the particular block of pixels, the path beginning at the particular block of pixels.

6. The method of claim 1, wherein generating the time-invariant value comprises utilizing machine learning with the similarity values of the plurality of blocks of pixels of the first image.

7. A method comprising:

under control of a computing device configured with computer-executable instructions, identifying a similarity of a particular block of pixels of a first image to other blocks of pixels of the first image, the particular block of pixels representing a feature of the first image;

utilizing machine learning to generate feature quality information comprising a time-invariant value that indicates a quality of the feature of the first image, the feature quality information being generated based on the similarity of the particular block of pixels of the first image to the other blocks of pixels of the first image;

searching in a second image to find a block of pixels that has a threshold amount of similarity to the particular block of pixels; and determining whether the block of pixels of the second image corresponds to the particular block of pixels of the first image based at least in part on the feature quality information.

8. The method of claim 7, wherein the feature quality information is generated based on an average similarity of the other blocks of pixels of the first image to the particular block of pixels of the first image.

9. The method of claim 7, wherein the feature quality information is generated based on a largest similarity, to the particular block of pixels, of blocks of pixels of the other blocks of pixels that are located at a predetermined distance to the particular block of pixels.

10. The method of claim 7, wherein the feature quality information is generated based on a second largest similarity, to the particular block of pixels, of blocks of pixels of the other blocks of pixels that are located within a first predetermined distance to the particular block of pixels and that are located outside a second predetermined distance to the particular block of pixels.

11. The method of claim 7, wherein the feature quality information is generated based on an average similarity value of blocks of pixels of the first image that are located along a path in the first image of greatest similarity to the particular block of pixels.

12. The method of claim 7, wherein utilizing machine learning comprises utilizing logistic regression with the similarity of the particular block of pixels of the first image to the other blocks of pixels of the first image.

13. The method of claim 7, wherein determining whether the block of pixels of the second image corresponds to the particular block of pixels of the first image comprises:

generating a confidence value for the block of pixels of the second image based on the feature quality information and a similarity value of the block of pixels of the second image to the particular block of pixels of the first image; and determining whether the confidence value satisfies one or more criteria.

14. One or more computer-readable storage media storing computer-readable instructions that, when executed, instruct one or more processors to perform the method of claim 7.

15. A system comprising:

one or more processors; and memory, communicatively coupled to the one or more processors, storing executable instructions that, when executed by the one or more processors, cause the one or more processors to perform acts comprising:

identifying a similarity of a particular block of pixels of a first image to other blocks of pixels of the first image, the particular block of pixels representing a feature of the first image;

utilizing machine learning to generate feature quality information comprising a time-invariant value that indicates a quality of the feature of the first image, the feature quality information being generated based on the similarity of the particular block of pixels of the first image to the other blocks of pixels of the first image;

searching in a second image to find a block of pixels that has a threshold amount of similarity to the particular block of pixels; and determining whether the block of pixels of the second image corresponds to the particular block of pixels of the first image based at least in part on the feature quality information.

16. The system of claim 15, wherein the feature quality information for the first image is generated based on an average similarity of the other blocks of pixels of the first image to the particular block of pixels of the first image.

17. The system of claim 15, wherein the feature quality information for the first image is generated based on a largest similarity, to the particular block of pixels, of blocks of pixels of the other blocks of pixels that are located at a predetermined distance to the particular block of pixels.

18. The system of claim 15, wherein the feature quality information for the first image is generated based on a second largest similarity, to the particular block of pixels, of blocks of pixels of the other blocks of pixels that are located within a first predetermined distance to the particular block of pixels and that are located outside a second predetermined distance to the particular block of pixels.

19. The system of claim 15, wherein the feature quality information for the first image is generated based on an average similarity value of blocks of pixels of the first image that are located along a path in the first image of greatest similarity to the particular block of pixels.

\* \* \* \* \*